Figure 14:
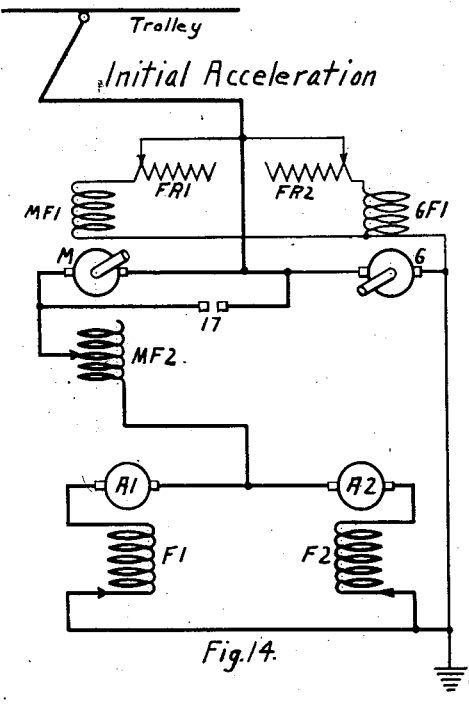

R. E. HELLMUND.
SYSTEM OF CONTROL.
APPLICATION FILED JAN. 10, 1916.
1,303,310.
Patented May 13, 1919.
7 SHEETS—SHEET 1.
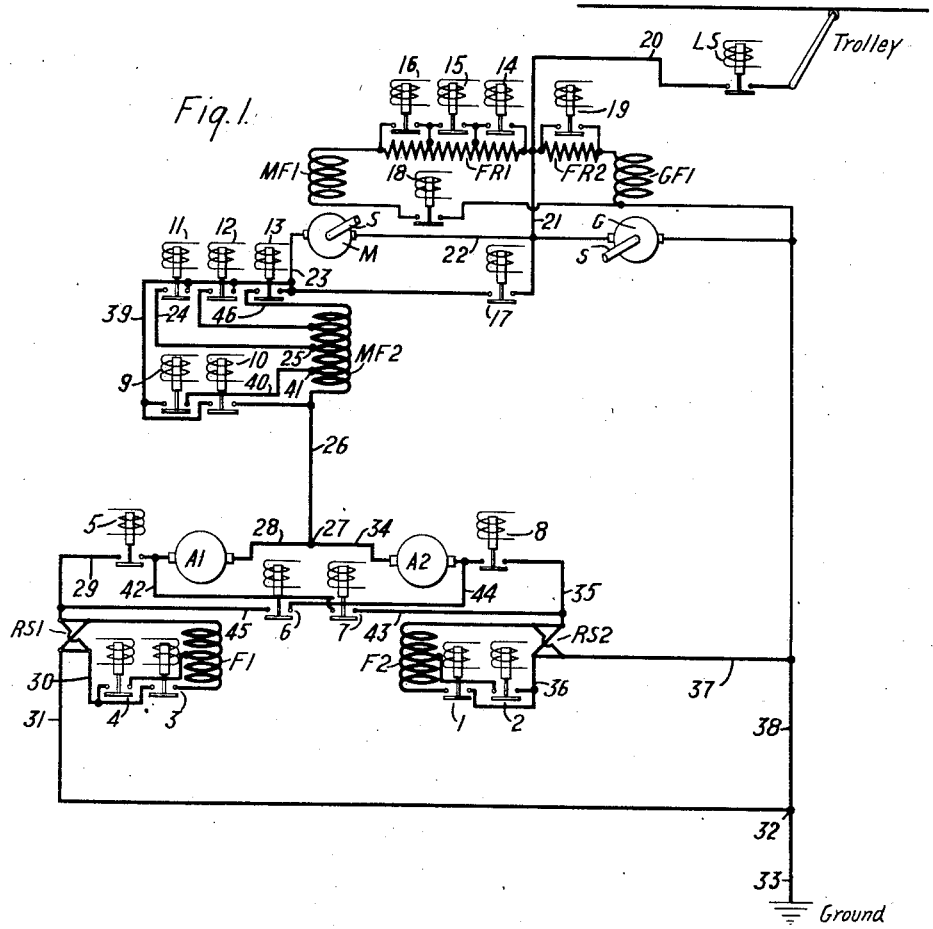
WITNESSES:
Fred. A. Lind
Fred H. Miller
INVENTOR
Rudolf E. Hellmund
BY
Wesley G. Carr
ATTORNEY

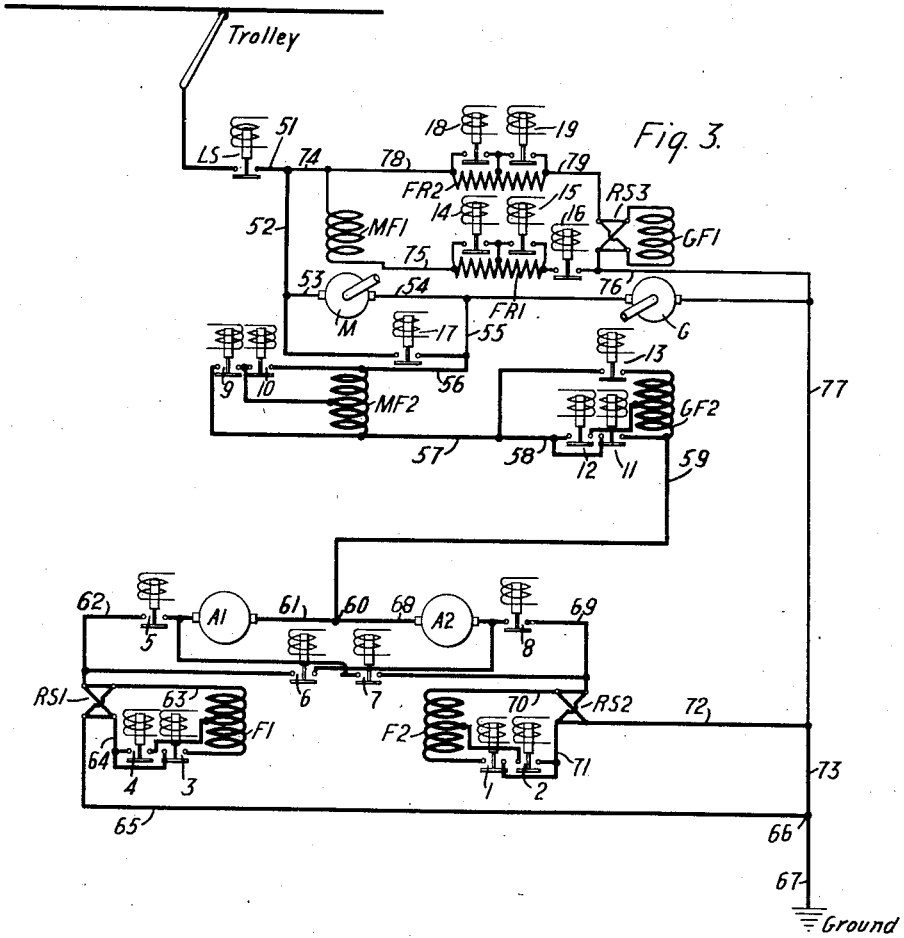

R. E. HELLMUND.
SYSTEM OF CONTROL.
APPLICATION FILED JAN. 10, 1916.
1,303,310.
Patented May 13, 1919.
7 SHEETS—SHEET 3.
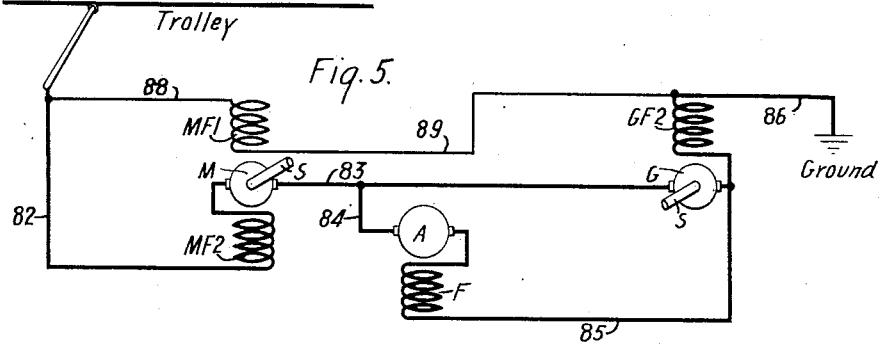
Fig. 5.
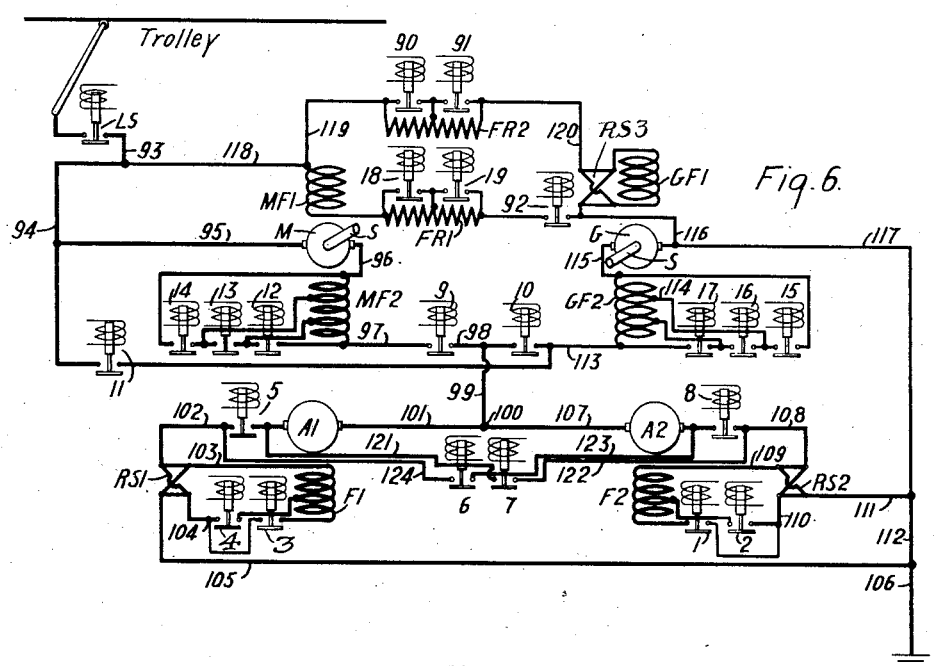
Fig. 6.
Fig. 7.
WITNESSES:
Fred A. Lind
Fred H Miller
INVENTOR
Rudolf E. Hellmund
BY
Wesley G. Carr
ATTORNEY R. E. HELLMUND.
SYSTEM OF CONTROL.
APPLICATION FILED JAN. 10, 1916.
1,303,310.
Patented May 13, 1919.
7 SHEETS—SHEET 4.
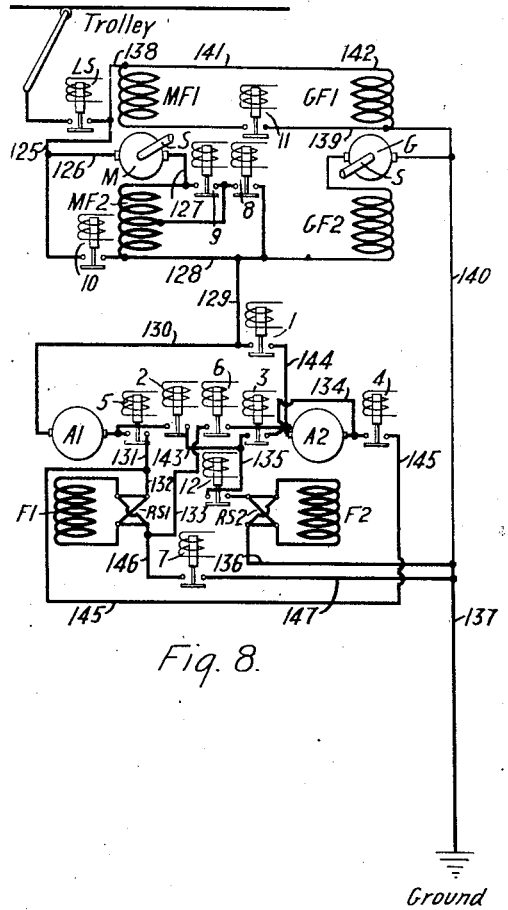
Fig. 8.
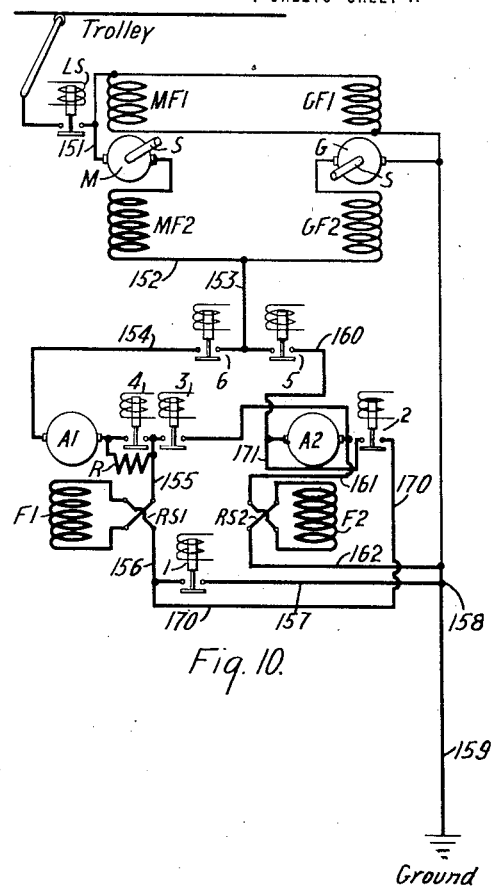
Fig. 10.
Fig. 9.
| Motoring | | | | | | | | | | | | |
|---|---|---|---|---|---|---|---|---|---|---|---|---|
| | 1 | 2 | 3 | 4 | 5 | 6 | 7 | 8 | 9 | 10 | 11 | LS=12 |
| a | | o | | o | o | | | | | | o | o |
| b | | o | | o | o | | o | | | | o | o |
| c | | o | | o | o | | o | o | | | o | o |
| d | | o | | o | o | | o | o | o | | | o |
| Generating | | | | | | | | | | | | |
| a' | o | o | | o | | | o | | | | o | o |
Fig. 11.
| Generating | | | | | | | |
|---|---|---|---|---|---|---|---|
| | 1 | 2 | 3 | 4 | 5 | 6 | LS |
| a' | o | | o | o | o | o | o | Parallel |
| b' | | | | o | | | o | Transition |
| c' | | o | | | o | o | o | |
| d' | | o | | | o | o | | |
| e' | | o | | o | | o | o | Series |
WITNESSES:
Fred. A. Lind
Fred H. Miller
INVENTOR
Rudolf E. Hellmund
BY
Wesley G. Carr
ATTORNEY

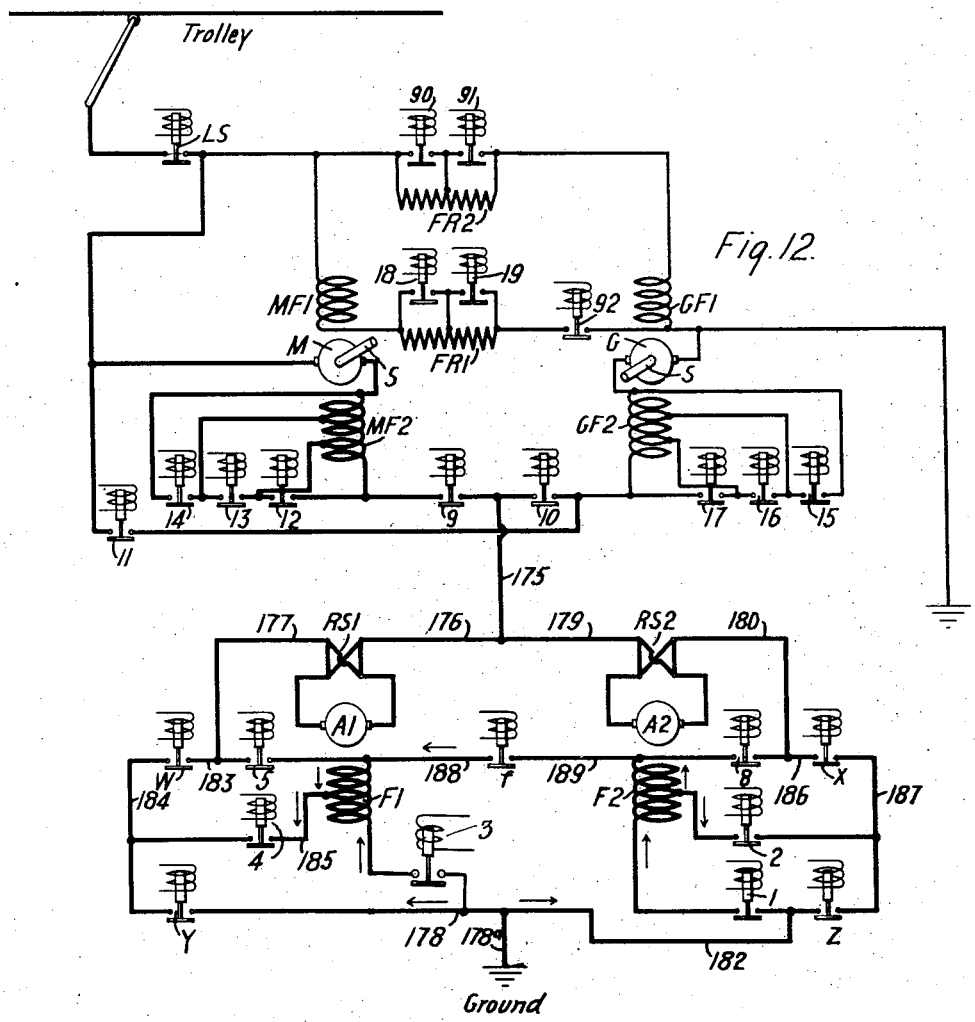

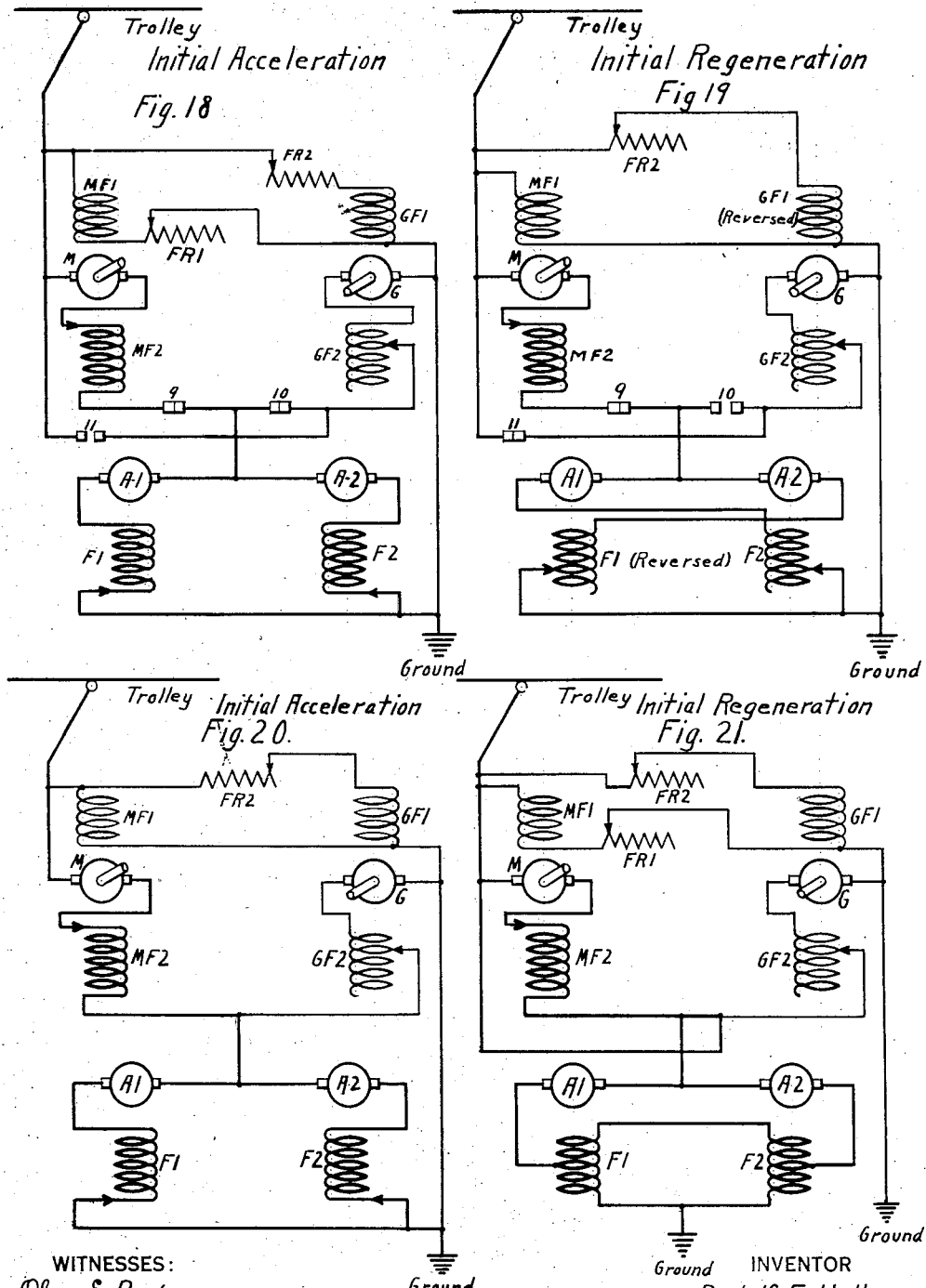

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,303,310.      Specification of Letters Patent.      Patented May 13, 1919.

Application filed January 10, 1916. Serial No. 71,198.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Systems of Control, of which the following is a specification.

My invention relates to systems of control and especially to the regenerative control of direct-current electric railway motors and the like.

Since most motors that are used for traction purposes at times reach speeds which are considerably in excess of the speed at the normal rating, it becomes necessary to operate under relatively weak field-current conditions when regenerating at a high speed, even though the machine voltage has to be slightly higher than the supply-circuit voltage, whereby a relatively heavy armature current is required to obtain the desired braking torque. Such heavy armature currents are undesirable, not only because of the increased heating effect in the armatures but also because the resultant relation of armature ampere-turns to field circuit ampere-turns is liable to produce bad flashing characteristics in the machines.

One of the objects of my invention is to provide a reliable and effective system of regenerative control for electric railway motors or the like whereby regenerative operation may be satisfactorily achieved without the undesirable characteristics referred to above.

Another object of my invention is to provide, in a system of the above-indicated character, various novel circuit combinations for inherently maintaining a substantially equal distribution of load current between a plurality of parallel-connected armatures.

Heretofore, the majority of the regenerative direct-current systems for electric vehicle motors of the series type have embodied means, in the form of batteries or motor-generator sets, to impress a "shunt" excitation upon the field windings in addition to current received from the armatures of the regenerating machines. In such systems, a sudden variation in the regenerated current has often caused excessive distortions of the field fluxes, with consequent "flash-over" troubles. Various special means have been proposed to overcome the difficulties but it will be appreciated that, inherently, no such system will be as satisfactory as a system embodying a machine having a straight series characteristic during regeneration whereby the armature current and the field-winding current are identical at all times, and excessive field flux distortions are substantially precluded.

In my co-pending application, Serial No. 35,166, filed June 19, 1915, I have shown and described a system embodying machines having the above-mentioned desirable characteristics, and I therein employ a motor-generator set, or the like, in conjunction with the main machines in a novel manner to effect satisfactory regenerative operation. According to my present invention, I apply certain of the principles that are set forth in the application just mentioned to a plurality of parallel-related dynamo-electric machines during the regenerative period, and, in addition, I employ other novel main-circuit connections for automatically and inherently maintaining a substantially equal distribution of load current between the regenerating armatures, as hereinafter more fully set forth.

Figure 15:
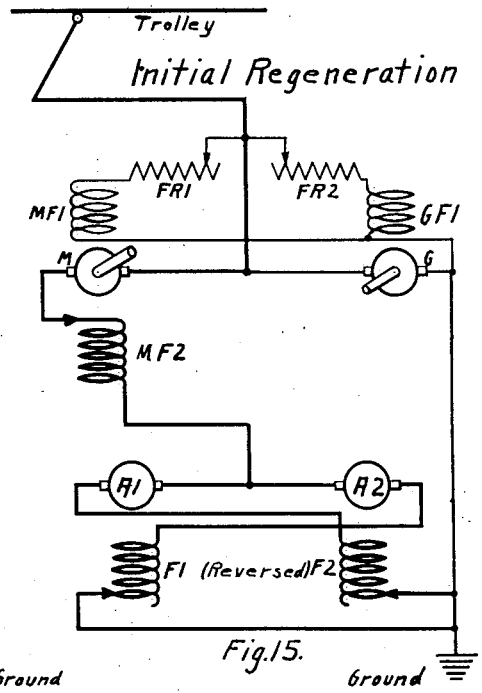
Figure 16:
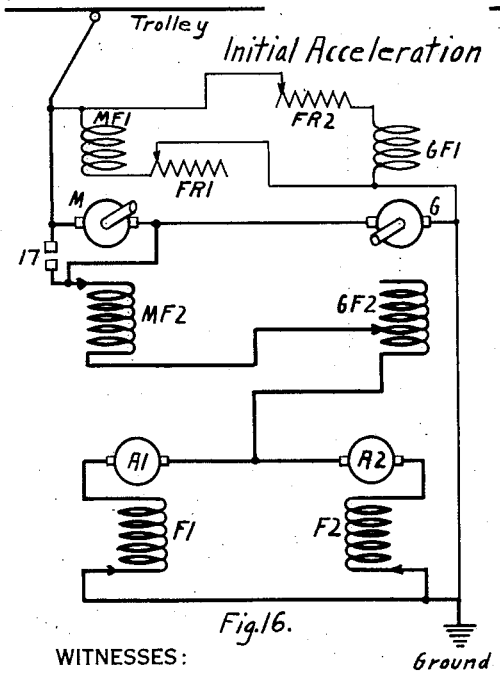

In the accompanying drawings, Figure 1 is a diagrammatic view of the main circuits of a system of control embodying my invention; Fig. 2 is a sequence chart of well-known form for indicating the desired sequence of accelerating and regenerating operation of the various motor-controlling switches that are illustrated in Fig. 1; Fig. 3 and Fig. 4, Fig. 6 and Fig. 7, Fig. 8 and Fig. 9, Fig. 10 and Fig. 11, and Fig. 12 and Fig. 13 are views, corresponding, respectively to Fig. 1 and Fig. 2, of various modifications of my invention; Fig. 5 is a diagrammatic view illustrating a modified main-circuit connection; Fig. 14 and Fig. 15 are simplified diagrammatic views, corresponding to Fig. 1, of the circuit connections for initial acceleration and initial regeneration, respectively, as denoted by the accompanying legends; and Figs. 16 and 17, Figs. 18 and 19, and Figs. 20 and 21 are analogous view to Figs. 14 and 15, respectively, and correspond to Figs. 3, 6 and 12 respectively.

Referring to Fig. 1, the system shown comprises a plurality of suitable supply-circuit conductors on Trolley and Ground; a plurality of dynamo electric machines respectively having armatures A1 and A2 and field magnet windings F1 and F2 of the series-type, said main machines being adapted for both acceleration and regeneration; a plurality of auxiliary dynamo-electric machine armatures M and G which may conveniently comprise the two armatures of a motor-generator set or the like; a plurality of reversing switches RS1 and RS2 of any well-known type for reversing the electrical relations of the respective main armatures and field windings; and a plurality of motor-controlling switches LS and 1 to 19, inclusive, for making various circuit connections, as about to be described.

In general, the main machines are connected in parallel relation, the auxiliary armature M is connected in series relation with the main machines and the other auxiliary armature is connected in substantially parallel relation to the main machines.

The auxiliary armatures M and G may be mechanically associated in any suitable manner, as by a shaft $s$.

The auxiliary armature M is provided with a supply-circuit-excited field-magnet winding MF1 with which a variable resistor FR1 is associated and is also provided with a variable series field-magnet winding MF2 that is differentially connected with respect to the first field winding MF1 during regenerative operation and is disposed in the main circuit intermediate the auxiliary armature M and the parallel-related main machines. The other auxiliary armature G is shown as provided with a supply-circuit-excited field-magnet winding GF1 with which is associated a variable resistor FR2. The series auxiliary field winding MF2 is so proportioned that, when all of its turns are in circuit, its effect will over-balance the effect of the associated differentially-connected field winding MF1, provided the regenerative current equals or exceeds a predetermined value at the time.

Assuming that it is desired to effect acceleration of the main motors, the following method may be employed: the switches LS, 1, 3, 5, 8, 11, 14, 15, 16, 18 and 19 are closed, whereby a circuit is established from the Trolley through conductors 20, 21 and 22, the auxiliary armature M, conductor 23, switch 11, conductor 24, which is connected to an intermediate point 25 of the auxiliary series field-winding MF2, a predetermined portion of that field winding, and conductor 26 to a junction-point 27, where the circuit divides, one branch including conductor 28, main armature A1, switch 5, conductor 29, certain contact members (not shown) of the reversing switch RS1, the entire main field winding F1, switch 3, conductor 30, certain other contact members (not shown) of the reversing switch RS1, conductor 31, junction-point 32, and conductor 33 to the negative conductor Ground, and the other branch including conductor 34, main armature A2, switch 8, conductor 35, the reversing switch RS2, the entire main field winding F2, switch 1, conductor 36, reversing switch RS2 and conductors 37 and 38 to the negative conductor 33. The simplified circuits are shown in Fig. 14.

It will be observed that the switches 14, 15 and 16 are initially closed to short-circuit the auxiliary field resistor FR1, whereby a relatively strong field-excitation from the field-winding MF1 is provided for the auxiliary armature M. Consequently, the voltage induced in the armature M attains a value that is slightly less than the supply-circuit voltage, whereby a relatively small electromotive force is impressed upon the terminals of the main motors without requiring the use of any series-circuit resistor, as in common practice. As hereinbefore stated, the auxiliary armature M is initially connected in series relation with the main machines, while the other auxiliary armature G is connected across the supply conductors "Trolley" and "Ground".

It is evident that, with the connection recited, the armature M acts as a so-called "negative booster", inasmuch as it consumes part of the line voltage; this means that it runs as a motor producing mechanical energy. Such energy is imparted to the armature G which, acting as a generator, returns the energy to the supply circuit.

In connection with the various main circuits that are illustrated in the present application, I have not shown any auxiliary governing circuits or controllers, for the reason that I do not deem such auxiliary circuits or controllers necessary to a full and complete understanding of my present invention. Moreover, it will be understood that the particular type of auxiliary governing system that is employed is immaterial to my present invention, and any of the well-known types, such as a master controller for suitably energizing the actuating coils of the switches that are illustrated in Fig. 1 or a main circuit controller having control fingers and contact segments that correspond to the various switches, may be employed, if desired.

Assuming that the master controller (not shown) is actuated to its second position $b$ in the sequence chart of Fig. 2, the switch 14 is opened, and, in the succeeding positions $c$ and $d$, the switches 15 and 16 are respectively opened. Consequently, the field excitation of the auxiliary armature M is gradually decreased, whereby the voltage of the armature M is correspondingly reduced, and the voltages impressed upon the terminals of the main motors are accordingly increased to gradually accelerate the motors.

In position $e$ of the master controller (not shown) the switch 9 is closed, while, in position $f$, the switch 11 is opened, thereby completing a circuit from the auxiliary armature M through conductors 23 and 39, switch 9 and conductor 40 to a second intermediate point 41 of the series auxiliary field winding MF2, whereby the excitation of the armature M from its series field winding is also reduced to indirectly effect a further increase in the acceleration of the main motors by further reducing the voltage of auxiliary armature M. Such change is evident since, as previously pointed out, auxiliary field windings MF2 and MF1 are differentially acting during regeneration and thus must be cumulative during acceleration.

In position $g$, the switch 18 is opened, thereby entirely disconnecting the auxiliary field winding MF1 from circuit and reducing the voltage of the armature M to substantially zero, thus allowing the short-circuiting of the armature M by the closure of the switch 17, which occurs as soon as the master controller (not shown) is moved to its position $h$. At this time, therefore, the main motors are connected across substantially the full supply-circuit voltage.

To effect a further accelerating step, the master controller (not shown) may be moved through position $i$ to its final position $j$, whereby the switches 2 and 4 are first closed to temporarily short-circuit predetermined portions of the main field-magnet windings F1 and F2, whereupon the associated switches 1 and 3 are opened to open-circuit the short-circuited portions, thus providing the well-known "field-control" for accelerating the motor speeds, in accordance with familiar principles. Moreover, in position $i$, the switch 19 may be opened to remove the short circuit of the resistor FR2 and thereby correspondingly weaken the excitation of the auxiliary armature G. The weakening of the excitation of the armature G causes the motor-generator set to increase in speed, according to familiar shunt-motor principles. Thus the motor-generator set is already rotating at a desired relatively high speed when regeneration is begun.

Assuming that the main motors are coasting and that it is desired to effect regeneration, the main field windings F1 and F2 are first reversed for a well-known purpose, and the switches 2, 4, 6, 7, 13, and 18 may be closed. Before connection of the main machines to the supply circuit by the closure of the switch LS, the voltage of the armature M is adjusted, by reason of the above-mentioned increased speed thereof, to be slightly larger than the supply-circuit voltage and acting in opposition to the voltage of the other auxiliary armature G. The resultant voltage of the auxiliary armature M and of the line thus impressed upon the main motors is, therefore, a relatively small voltage having a direction opposite to that of the line voltage. As soon as the main motor circuits have closed, this small voltage sends a current through the main machines which has a direction opposite to that of the accelerating current; in other words, it has the direction of a generator current. Consequently, the main machines will rapidly build up a regenerative voltage and cause a regenerative current to traverse the auxiliary series field winding MF2. Since the action of the field winding MF2 is differential or in opposition to the action of the auxiliary field winding MF1 during regeneration, as hereinbefore mentioned, the voltage of the armature M will rapidly decrease, pass through zero value and finally assume a negative value, whereby the voltage of the armature M assists the supply-circuit voltage, or, in other words, the voltage of the second auxiliary armature G as to the line voltage, making the resultant voltage across the main machines higher than the supply-circuit voltage, as is desirable. With this operating condition, the auxiliary armature M consumes the difference in voltage between the line voltage and the higher electromotive force induced in the main machines; in other words (the armature M again acts as a "negative booster" and develops energy as a motor. This energy is imparted to the auxiliary armature G which, acting as a generator, returns such energy to the line.

Since switches 2 and 4 are closed, only predetermined portions of the main field windings F1 and F2 are included in the initial regenerative circuit, thus tending to prevent undesirably high initial regenerative voltages of the main machines.

It will be observed that, by the closure of switch 7, a circuit is established from the low-voltage terminal of the main armature A1, through conductor 42, switch 7 and conductor 43 to the other or non-corresponding field winding F2; while the closure of switch 6 completes a circuit from the low-voltage terminal of the main armature A2 through conductor 44, switch 6 and conductor 45 to the non-corresponding main field winding F1. Thus, the current of each main armature traverses the field-magnet winding of the other main armature and thereby effects a balancing or equalizing operation in such manner that a tendency to increase the regenerated current of one main armature immediately and inherently tends to increase the voltage of the other main armature. Such interconnection of non-corresponding main armatures and field windings is also employed in connection with several of the other control systems that are to be described.

The closure of the switch 13 connects the entire series auxiliary field winding MF2 in circuit intermediate conductors 23 and 26 (see Fig. 15).

For effecting regulation of the regenerative operation, the master controller (not shown) may be actuated to its second regenerative position $b'$, whereby the switches 1 and 3 are closed, while, in position $c'$, switches 2 and 4 are opened, thereby connecting the entire main field windings F1 and F2 in circuit a selected time after the initial regenerative connection has been effected.

In positions $d'$ to $i'$, the switches 12, 11 and 10 that are associated with various sections of the series auxiliary field winding MF2 are suitably manipulated, as indicated in the sequence chart of Fig. 2, whereby the voltage of the armature M is operatively varied with respect to the parallel-related main machines, to gradually decrease the regenerated voltages of the main machines as the speed thereof decreases and thus maintain a substantially constant regenerated current.

In positions $j'$, $k'$ and $l'$, the switches 14, 15, and 16 are respectively closed, thus gradually short-circuiting the auxiliary field resistor FR1 and correspondingly strengthening the field excitation of the armature M from the field winding MF1. It will be understood that the increase of the field strength of the field winding MF1 produces the same effect as the decreasing of the excitation of the field winding MF2 by reason of the differential relation of the two auxiliary field windings.

By decreasing the effect of the auxiliary series field winding MF2, and increasing the effect of the shunt field winding MF1, a point will be reached where the two effects will neutralize each other so that the voltage of the armature M equals zero and the auxiliary motor-generator set is running "light" for the time being. By further varying the excitation of the field windings, as just recited, while the vehicle speed is decreasing, the excitation of the field winding MF2 will become weaker than that of the field winding MF1, thus leading to a reversal of the effective field flux and the voltage of the armature M, with the result that the voltage of the main machines is lower than the line voltage. The electromotive force of the armature M is thus added to that of the main machines to induce a total voltage sufficiently in excess of the line voltage to permit regeneration. In other words, the armature M now acts as a "positive booster" with respect to the main machines and, therefore, as a generator. The mechanical energy required for driving it as such is furnished by the auxiliary armature G which now runs as a motor. The armature G consumes, for such motor operation, a part of the electrical energy that is generated by the main machines and the armature M.

Reference may now be had to Fig. 3 wherein the system shown comprises the supply-circuit conductors, the main dynamo-electric machines, the auxiliary armatures M and G, the auxiliary field windings MF1, MF2 and GF1, as already described in connection with the system that is shown in Fig. 1, and, in addition, a plurality of suitable motor-controlling switches LS and 1 to 19, inclusive, a second auxiliary field winding GF2 of the series-type for the armature G, and a reversing switch RS3 that is associated with field winding GF1.

Assuming that it is desired to effect acceleration of the main motors, the switches LS, 1, 3, 5, 8, 12, 14, 15 and 16 are initially closed, whereby one circuit is established from the Trolley through switch LS, conductors 51, 52 and 53, auxiliary armature M, conductors 54, 55 and 56, the entire series field winding MF2, conductors 57 and 58, switch 12, a portion of the series field winding GF2, and conductor 59, to a junction-point 60, where the circuit divides, one branch including conductor 61, main armature A1, switch 5, conductor 62, reversing switch RS1, conductor 63, the entire main field winding F1, switch 3, conductor 64, reversing switch RS1, conductor 65, junction-point 66, and conductor 67 to the negative conductor Ground, and the other branch including conductor 68, the main armature A2, switch 8, conductor 69, reversing switch RS2, conductor 70, the entire main field winding F2, switch 1, conductor 71, reversing switch RS2 and conductors 72 and 73 to the negative conductor 67.

One auxiliary field circuit is established from conductor 51 through conductor 74, field winding MF1, conductor 75, switches 14, 15 and 16, and conductors 76 and 77 to the negative conductor 73. Another field circuit is completed from conductor 74 through conductor 78, resistor FR2, conductor 79, and the reversing-switch RS3 and the field winding GF1 to conductor 76 (see Fig. 16).

Under this condition of acceleration, the armature M acts as a "negative booster" or motor, while the armature G is a generator. The generated current of the armature G combines with the line current flowing through the armature M to provide the total current for the main motors.

To effect further acceleration of the main machines, the master controller (not shown) may be moved to its subsequent operating position $b$, whereby the switch 14 is opened and in position $c$, switch 15 is opened to decrease the strength of the field winding MF1. Switch 18 is closed in position $c$, thereby gradually increasing the excitation of the field winding GF1.

In position $d$, the switch 19 is closed, while, in positions $e$, $f$ and $g$, the switches 9, 10 and 11 are closed, thereby first increasing the excitation of the field winding GF1, then short-circuiting sections of the field winding MF2 to correspondingly reduce the voltage of the armature M and then including the entire field winding GF2 in circuit to increase the voltage of the armature G.

In position $i$, the switch 17 is closed to short-circuit the auxiliary armature M, after the excitation of the field winding MF1 and the voltage of the armature M has been reduced to substantially zero.

In positions $j$ and $k$, the switches 2 and 4 are first closed and then the switches 1 and 3 are opened, thus again providing the well-known "field-control" accelerating step.

Thus, the parallel-related main machines are connected in initial-circuit relation with the two field windings GF2 and MF2 of the series type and the armature M across the supply circuit, and the relative voltages of the armatures M and G are then varied to gradually effect the acceleration of the main machines in a manner similar to that already set forth in connection with the system that is shown in Fig. 1.

To inaugurate regenerative operation of the system, the switches LS, 2, 4, 6, 7, 13 and 16 may be closed by actuation of the master controller (not shown) to its initial regenerative position $a'$, after the reversing switches RS1, RS2 and RS3 have been actuated to their respective reversed positions. The reversal of the switch RS3 effects the induction of a relatively small negative voltage in the auxiliary armature G, whereby a current is caused to traverse the main dynamo-electric machines in the correct regenerative direction and the voltages of the main machines are rapidly built up.

Upon the traversal of regenerative current through the field winding GF2, the voltage of the armature G will be reversed by reason of the differential action of the field windings GF1 and GF2 and, therefore, the voltage of the series-connected auxiliary armature M dependent upon initial regenerative speed conditions, may also be reduced even to a negative value through the action of the differentially-connected field magnet windings MF1 and MF2 and thus, the voltage of the main regenerating machines will attain a desired value that is in excess of the supply-circuit voltage.

Figure 17:
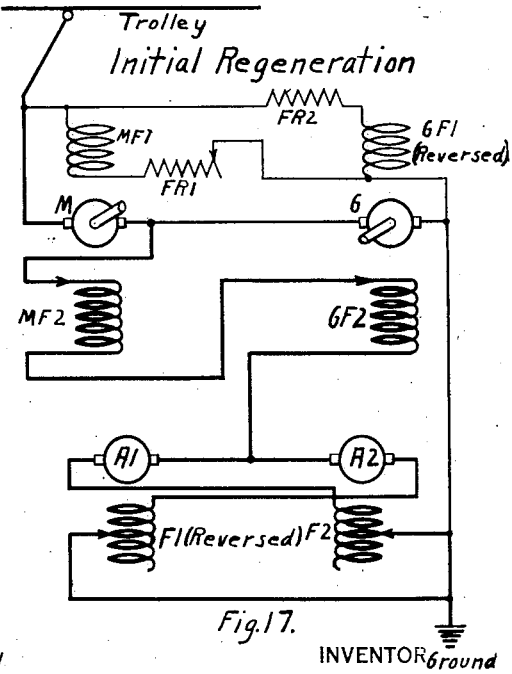

During regeneration, the main machine armatures are interconnected with non-corresponding field-magnet windings by reason of the closure of switches 6 and 7 as previously described (see Fig. 17).

To regulate the regenerative operation of the main machines, the master controller (not shown), may be actuated through its successive regenerative positions, the switches 1 and 3 being closed and the switches 2 and 4 being opened in positions $b'$ and $c'$ respectively, whereby the full main field windings F1 and F2 are connected in circuit in the manner already described in connection with Fig. 1.

In positions $d'$ and $e'$, the switches 15 and 14 are respectively closed, thereby increasing the shunt excitation of the armature M, and in positions $f'$ and $g'$, the switches 9 and 10 are closed to gradually effect the elimination of the series field excitation of the armature M.

In position $h'$, the switch 12 is closed, while, in position $i'$, the switch 13 is opened, thereby inserting the remaining portion of the auxiliary series field winding GF2 in circuit, for the purpose previously set forth.

During the progression just recited, and while the main machine speed is decreasing, the voltage of the main machines will gradually decrease from the initial value, which is usually above the line voltage, to successively decreasing values below the supply-circuit voltage until substantially zero speed and electromotive force are reached, if such operation is desirable. As in the case of the system shown in Fig. 1, the auxiliary armature M is acting as a motor and the auxiliary armature G as a generator, when the main machine voltage is above line voltage during regeneration; however, as soon as the main machine voltage drops below the supply-circuit electromotive force, the functions of the auxiliary armatures M and G reverse similarly to their action in the system that is illustrated in Fig. 1.

Referring to Fig. 5, the system shown comprises the supply-circuit conductors Trolley and Ground, a main dynamo-electric machine A and a field winding F of the series type; the auxiliary dynamo-electric machine armatures M and G and auxiliary field windings MF1, MF2 and GF2.

During initial regenerative conditions, a circuit is completed from the Trolley through conductor 82, field-magnet winding MF2, armature M, conductors 83 and 84, main armature A and field winding F, conductor 85, the field-magnet winding GF2 and conductor 86 to the negative conductor Ground, while an auxiliary field circuit is established from the Trolley through conductor 88, field-magnet winding MF1 and conductor 89 to the negative conductor 86.

The auxiliary armature M is thus connected in series relation with the main dynamo-electric machine, while the other auxiliary armature G is connected in parallel relation thereto, similarly to the systems hereinbefore described.

By employing the circuit connections that are illustrated in Fig. 5, the shunt field winding GF1 of Fig. 3 is not required, inasmuch as the motor-generator set will initially receive a relatively small current from the supply-circuit, which, by energizing the field winding GF2, will induce a relatively small voltage in the auxiliary armature G in such a direction as to cause the main dynamo-electric machine to build up its voltage in the regenerative direction. As soon as the main regenerative current begins to flow, the excitation of the field winding GF2 will be reversed, whereby the voltage of the auxiliary armature G will assume a direction in opposition to the voltage of the other auxiliary armature M. The system that is illustrated in Fig. 5 may be employed instead of the motor-generator set connections that are shown in Fig. 3, if desired, and, inasmuch as the general operation of the system, other than the operation just described, is similar to that already set forth in connection with Fig. 2, no further illustration or exposition of the control system is believed to be necessary here.

One of the advantages of the system that is illustrated in Fig. 3 is that each of the auxiliary armatures M and G carries only a portion of the main-machine current, as hereinbefore pointed out. Such a condition obtains while the main machine voltage is slightly less than the supply-circuit voltage, that is to say, during the latter or low-speed portion of the regenerative period, in which case the auxiliary armature G temporarily acts as a motor and the other auxiliary armature M as a generator. However, when the machine voltage slightly exceeds the supply-circuit voltage, as, under relatively high-speed regenerative conditions, the functions of the auxiliary armatures M and G are reversed, and, under such conditions, the voltage of the armature G may become materially higher than that of the supply circuit, thus making it necessary to properly design the armature G for such high voltages. Moreover, when the armature G is generating current at relatively high speeds, such current is added to the regenerative current of the main machines, which means that the other auxiliary armature M is obliged to carry the sum of all such currents and, consequently, must be designed to have a sufficient capacity therefor. It is evident, therefore, that the system of Fig. 3, while being very advantageous while the machine voltage is less than the supply-circuit voltage, is not so well adapted for the case wherein the machine voltage is in excess of the supply-circuit voltage, that is, during the initial or high-speed portion of the regenerative period.

Referring to Fig. 1, however, it will be seen that, even though the system operates in such manner that the machine voltage exceeds the supply-circuit voltage, neither of the auxiliary armatures M and G need be designed of a capacity sufficient to carry more than the regenerated current of the main machines and, moreover, does not need to be proportioned to withstand much more than the supply-circuit voltage; just enough more, in fact, to begin regenerative operation. It follows, therefore, that the system of Fig. 1 is more advantageous so long as the main machine voltage exceeds the supply-circuit voltage, whereas the system that is illustrated in Fig. 3 is better adapted for conditions when the main machine voltage is less than the supply-circuit voltage, corresponding to high-speed and to low-speed regeneration, respectively.

In Fig. 6 I disclose a system that combines the advantages of the systems that are shown in Fig. 1 and Fig. 3, respectively. The system of Fig. 6 comprises the supply-circuit conductors Trolley and Ground, the main dynamo-electric machines and the auxiliary dynamo-electric machine armatures and field-magnet windings, as illustrated in Fig. 3, and a plurality of suitable controlling switches, LS, 1 to 19, inclusive, and 90, 91 and 92.

Assuming that it is desired to effect acceleration of the main motors, the switches LS, 1, 3, 5, 8, 9, 10, 16, 17, 18, 19 and 92 may be closed, whereby one circuit is established from the Trolley through the switch LS, conductors 93, 94 and 95, the auxiliary armature M, conductor 96, the entire auxiliary series field-magnet winding MF2, conductor 97, switch 9 and conductors 98 and 99 to a junction-point 100 where the circuit divides, one branch including conductor 101, main armature A1, switch 5, conductor 102, reversing switch RS1, conductor 103, the entire main field winding F1, switch 3, conductor 104, reversing switch RS1, and conductors 105 and 106 to the negative conductor Ground, and the other branch including conductor 107, main armature A2, switch 8, conductor 108, reversing switch RS2, conductor 109, the entire main field winding F2, switch 1, conductor 110, reversing switch RS2 and conductors 111 and 112 to the negative conductor 106. The auxiliary armature M is thus connected in series relation with the parallel-related main motors; while the other auxiliary armature G is connected in substantially parallel relation to the main motors through a circuit which is completed from the conductor 98 through switch 10, conductor 113, switch 16, conductor 114, a predetermined portion of the series auxiliary field winding GF2, conductor 115, auxiliary armature G and conductors 116 and 117 to the negative conductor 112.

One auxiliary field-winding circuit is established from the conductor 93 through conductor 118, auxiliary field winding MF1, the short-circuited field regulating resistor FR1 and switch 92 to the conductor 117; while a second auxiliary field-winding circuit is completed from the conductor 118 through conductor 119, field-regulating resistor FR2, conductor 120 and the auxiliary field winding GF1 to conductor 117 (see Fig. 18).

The auxiliary armature M is thus initially provided with a relatively strong field excitation, while the other auxiliary armature G has a relatively weak field excitation, similarly to the systems already described.

To effect further acceleration of the main motors, the master controller (not shown) may be moved through its succeeding positions $b$ and $c$, whereby switches 12 and 13 are respectively closed to short-circuit predetermined portions of the auxiliary field windings MF2 and thus correspondingly decrease the voltage of the armature M.

In position $d$, switch 91 is closed to gradually strengthen the field excitation of the other auxiliary armature G, while, in the position $e$, the switch 19 is opened to further decrease the excitation of the auxiliary field winding MF1.

In positions $f$ and $g$, the switch 90 is closed and the switch 18 is opened to perform similar functions to those of the switches 91 and 19, as just described.

In position $h$, the switch 14 is closed to complete the short-circuit of the auxiliary field winding MF2, and, in position $i$, switch 92 is opened to entirely disconnect the field winding MF1 from circuit, thus reducing the voltage of the auxiliary armature M to substantially zero and permitting the safe closure of the switch 11 to short-circuit the auxiliary armature M and field winding MF2 as soon as the master controller is moved to its position $j$.

In the two final positions $k$ and $l$, the main field-winding switches 2 and 4 are first closed and the associated switches 1 and 3 are then opened to effect "field-control" of the main machines in the manner already set forth. In position $k$, the switch 9 may also be opened to open-circuit the auxiliary armature M.

Assuming that it is desired to effect regeneration, the reversing switches RS1, RS2 and RS3 are first actuated, and then the switches LS, 2, 4, 6, 7, 9, 11, 16, 17, 18, 19, 90, 91 and 92 may be closed, whereby the general operation of the auxiliary armatures M and G with respect to inaugurating regenerative operation of the main machines, is similar to that already set forth in connection with Fig. 3. The only important differences in the initial regenerative circuits of Fig. 6 and Fig. 3 are that, in Fig. 6, the high-voltage main armature terminals are connected to the auxiliary series field winding MF2, and the other auxiliary series field winding GF2 and the auxiliary armature G are connected across the supply circuit while, in Fig. 3, the main armature terminals in question are connected through the field windings GF2 and MF2 and the armature M, and the armature G is connected in series relation with the armautre M across the supply circuit. Thus the auxiliary armature G is adapted to increase the supply-circuit voltage during relatively high-speed conditions since the armature is then connected directly across the supply circuit, and the two auxiliary armatures M and G are adapted to divide the supply-circuit voltage during relatively low-speed conditions, inasmuch as the two armatures are connected in series relation across the supply circuit. The main armatures are again interconnected with the non-corresponding field windings by reason of the closure of the switches 7 and 6, whereby one circuit is established from the low-voltage terminal of armature A1 through conductor 121, switch 7, and conductor 122 to the conductor 108, while a second circuit is completed from the low-voltage terminal of the main armature A2, through conductor 123, switch 6, and conductor 124 to the conductor 102 (see Fig. 19).

To regulate the regenerative operation of the main machines, the master controller (not shown) may be moved to its succeeding regenerative positions $b'$ and $c'$, whereby the switches 1 and 3 are first closed and the switches 2 and 4 are then opened to provide the main machines with full field excitation a selected time after regenerative operation has been started, as hereinbefore described.

In the positions $c'$ and $d'$, switches 12 and 13 are successively closed to short-circuit certain portions of the auxiliary series field winding MF2 and thereby correspondingly increase the voltage of the auxiliary armature M by reason of the differential connection of the field windings MF1 and MF2, to compensate for the gradual decrease in the voltage of the main armatures A1 and A2, as their speed decreases, in order to maintain a substantially constant regenerated current.

In position $e'$, switches 9, 11, 12, 13, 16, 17, 90 and 91 are opened, thereby temporarily open-circuiting all machines during the transition from the connections that correspond to Fig. 1 to the connections that correspond to Fig. 3, in accordance with the change in the speed of the regenerating machines. The opening of switches 12 and 13 causes the auxiliary series field winding MF2, to be strengthened when the switch 9 is subsequently closed.

The opening of the switches 16 and 17 effects the inclusion in circuit of the remainder of the series auxiliary field winding GF2 to correspondingly weaken the excitation of the auxiliary armature G, by reason of its differential connection, as soon as switch 10 is closed, as set forth below, and thus further decrease the voltage of the main machines, while the opening of the switches 90 and 91 performs a similar function by including the field-regulating resistor FR2 in circuit with the auxiliary shunt field winding GF1.

As a result of the circuit changes just recited, conditions in the armatures M and G are such, when transition is completed, that suitable voltage conditions obtain in the regenerating armatures A1 and A2.

In position $f'$, the switches 9 and 10 are closed to directly connect the conductors 98 and 113, whereby a point intermediate the auxiliary field series winding MF2 and GF2 is connected to the point 100 between the main armatures A1 and A2. In position $g'$, the switch 13 is closed, to short-circuit a predetermined portion of the auxiliary field series field winding MF2; in position $h'$, the switch 17 is closed to short-circuit a portion of the auxiliary series field winding GF2; in positions $i'$ and $j'$, switches 14 and 16 are respectively closed to perform similar functions; while, in the final positions $h'$ and $l'$, switches 12 and 15 are respectively closed to also perform like functions, whereby the regenerative voltage of the main machines is gradually decreased as the speed thereof decreases to a relatively low value.

Referring now to Fig. 8, the system shown discloses a method for connecting the main machines in series relation through the accelerating period and in parallel relation during the regenerative period, whereby it is not necessary to initially raise the machine voltages above the supply-circuit voltage when regeneration is desired, at relatively high speeds.

Assuming that it is desired to effect acceleration of the machines, switches LS, 3, 5, 6, 11, and 12 may be initially closed, whereby circuit is established from the Trolley through switch LS, conductors 125 and 126, auxiliary armature M, conductor 127, the entire auxiliary series field winding MF2, conductors 128, 129 and 130, main armature A1, switch 5, conductors 131 and 132, reversing switch RS1, main field winding F1, reversing switch RS1, conductor 133, switch 6, main armature A2, conductor 134, switch 3, conductor 135, switch 12, reversing switch RS2, main field winding F2, reversing switch RS2 and conductors 136 and 137 to the negative conductor Ground. Thus, the main machines and the auxiliary armature M are connected in series circuit relation, while the other auxiliary armature G is connected in substantially parallel relation with the series-connected main machines.

One auxiliary field circuit is established from conductor 125, through conductor 138, auxiliary field winding MF1, switch 11, conductors 139 and 140 to the negative conductor 137. Another field circuit is completed from conductor 138 through conductors 141 and 142 and auxiliary field winding GF1 to conductor 140.

As a means of partially accelerating the main machines, the master controller (not shown) may be moved through its positions $b$ and $c$, whereby the switches 8 and 9 are closed to gradually short-circuit the auxiliary series field winding MF2. In position $d$, the switch 11 is first opened to entirely disconnect the auxiliary shunt-field winding MF1 from circuit and the switch 10 may then be closed to short-circuit the auxiliary armature M and field winding MF2, in a manner similar to that hereinbefore set forth.

In the initial regenerative position, the switches LS, 1, 2, 4, 7, 11 and 12 are closed, whereby the circuits are completed as already set forth, as far as the conductor 129, where the circuit now divides, one branch including conductor 130, main armature A1, switch 2, conductors 143 and 135, switch 12, reversing switch RS2, main field winding F2, reversing switch RS2 and conductor 136 to the negative conductor 137, and the other branch including switch 1, conductor 144, main armature A2, switch 4, conductors 145 and 132, reversing switch RS1, main field winding F1, reversing switch RS1, conductor 146, switch 7 and conductor 147 to the negative conductor 137.

The remainder of the regenerative operation may be completed in a manner similar to that already described in connection with Fig. 6 and no further exposition thereof is believed to be necessary here.

In some cases it may be necessary and desirable to employ parallel-series regeneration, that is, to connect the main machines in parallel relation during high-speed regeneration and in series relation during low-speed regenerative operation. Such a system, as combined with a set of main-circuit connections arranged in accordance with my invention, is shown in Fig. 10, wherein the only essential differences from the regenerative system that is illustrated in Fig. 6 reside in the locations of certain of the main-circuit switches which form circuits that are about to be traced.

Referring to the regenerative connections of Fig. 10, the switches LS, 1, 3, 4, 5 and 6 may be closed when the master controller (not shown) is moved to its initial regenerative position $a'$, whereby one circuit is established from the Trolley through switch LS, conductor 151, auxiliary armature M, auxiliary series field winding MF2, conductors 152 and 153, switch 6, conductor 154, main armature A1, switch 4, conductor 155, reversing switch RS1, main field winding F1, reversing switch RS1, conductor 156, switch 1 and conductor 157 to a junction-point 158.

Another branch circuit is completed from conductor 153, through switch 5, conductor 160, main armature A2, conductor 161, reversing switch RS2, main field winding F2, reversing switch RS2 and conductor 162 to the junction-point 158, whence circuit is completed to the negative conductor Ground.

The switch 3 is closed during parallel regenerative operation to directly connect the low-voltage terminals of the main armatures A1 and A2 and thus aid in maintaining an equalization of the regenerative armature currents.

During the transition of the main machines from parallel to series relation, the switches 1, 3, 4, and 6 are first opened, thereby open-circuiting the main armature A1 and switches 2 and 6 are next closed, while switch 5 is subsequently opened. Consequently, a circuit is completed from conductor 153, through switch 6, conductor 154, main armature A1, transition resistor R which bridges the switch 4, conductor 155, main field winding F1, conductors 156 and 170, switch 2, conductor 171, main armature A2, conductor 161, main field winding F2 and conductor 162 to the negative conductor Ground.

In the full-series position $e'$, the switch 4 is closed to short-circuit the transition resistor R, and further regulation of the regenerative operation may be accomplished in any suitable manner, as set forth in connection with the previous figures.

In the systems so far described, a substantially equal distribution of regenerative load current has been effected by the interconnection of non-corresponding main armatures and field windings. In Fig. 12, an alternative method for maintaining such an equal distribution of load between two parallel-related series-type generators is illustrated.

In Fig. 12, the circuit connections between the Trolley and the main regenerating machines are similar to those illustrated in Fig. 6, and only the remaining circuit connections which are different from that figure will be here described.

During the accelerating period, switches LS, 1, 3, 5, 8, 9, 10, 16, 17, 18, 19 and 92 are closed, whereby a circuit is completed from a point intermediate switches 9 and 10 through conductors 175 and 176, reversing switch RS1, main armature A1, reversing switch RS1, conductor 177, switch 5, the entire main field winding F1, switch 3 and conductors 178 and 178$^a$ to the negative conductor Ground. A parallel circuit is completed from conductor 175, through conductor 179, reversing switch RS2, main armature A2, reversing switch RS2, conductor 180, switch 8, the entire main field winding F2, switch 1 and conductor 182 to the negative conductor 178$^a$ (See Fig. 20).

If it is desired to subsequently effect "field-control" of the motors, the switches 4, $y$, 2, and $z$ may be closed to temporarily short-circuit a portion of the main field windings F1 and F2, and the switches 3 and 1 may be then opened, in accordance with customary practice.

When regenerating, the switches $w$, $x$, $f$, 1, 2, 3, 4, 9, 11, 16, 17, 18, 19, 90, 91 and 92 are closed, whereby one circuit is completed from the low-voltage terminal of the first armature A1, through reversing switch RS1, conductors 177 and 183, switch $w$, conductor 184, switch 4 and conductor 185 preferably to the intermediate point of the main field winding F1 that was employed during "field-control" operation of the accelerating motors.

A similar circuit is completed from the low-voltage terminal of the main armature A2 through reversing switch RS2, conductors 180 and 186, switch $x$, conductor 187, and switch 2 preferably to the intermediate point of the main field winding F2 that was utilized for "field-control" purposes during acceleration.

By the closure of switch $f$, the upper terminals of the main field windings F1 and F2 are directly connected through conductor 188, switch $f$ and conductor 189, while the lower terminals of the main field windings are connected through conductors 178 and 182 and the switches 1 and 3. The main armatures are thus connected to intermediate points of the main field windings, while the corresponding ends of the field winding are interconnected (see Fig. 21).

The balancing operation of the system of connections just recited is fully set forth in my co-pending application, Serial No. 69,187, filed Dec. 29, 1915, and may be briefly described as follows: When the regenerative currents of the two main armatures are substantially equal, the lower sections of the main field windings act as exciting windings, while the upper sections are substantially inactive. However, in case the armature A1, for example, temporarily generates a slightly higher voltage than the armature A2, any increased regenerative current will tend to flow through the armature A1 and the lower or exciting portion of the main field winding F1. Since the sum of the pairs of corresponding main armature and field voltages, that is, the total machine voltages, must equal the supply-circuit voltage, it follows that the field winding F2 has the higher voltage at the instant in question, whereby the unbalanced voltage conditions of the two main field windings will cause current to flow from the upper section of the field winding F2 to the upper section of the field winding F1, thus strengthening the excitation of the armature A2 and weakening the excitation of the other armature A1, as indicated by the arrows, inasmuch as the currents in the two sections of the field winding F2 assist each other, while the currents in the two sections of the field winding F1 exert an opposing action. The result of such an inherent action of the system of connections in question is to maintain a substantially balanced distribution of regenerative current between the main armatures, as more fully set forth in my above last-identified co-pending application.

I do not wish to be restricted to the specific circuit connections or location or arrangement of parts herein set forth, as various modifications thereof may be made without departing from the spirit and scope of my invention. I desire, therefore, that only such limitations shall be imposed as are indicated in the appended claims.

I claim as my invention:

1. In a system of control, the combination with a supply circuit and a plurality of momentum-driven main dynamo-electric machines severally having armatures and field-magnet windings, of auxiliary dynamo-electric means for inaugurating regenerative operation of the main machines, said means being provided with certain differentially-disposed field-magnet windings, means for varying the relative effect of said windings under predetermined conditions, and means for inherently maintaining a substantially equal distribution of regenerative current between the main machines.

2. In a system of control, the combination with a supply circuit and a plurality of momentum-driven main dynamo-electric machines severally having armatures and field-magnet windings, of a plurality of auxiliary dynamo-electric machine armatures, means for connecting said auxiliary armatures in circuit to inaugurate regenerative operation of the main machines, a shunt-excited field-magnet winding for one of said armatures, a second field-magnet winding therefor connected in series-relation therewith and with said main machine and differentially disposed with respect to said shunt-excited field winding, means for varying the relative effects of said auxiliary field windings under predetermined conditions, and means for inherently and rapidly varying the main machine voltages to maintain a substantially equal distribution of regenerative current between the main machines.

3. In a system of control, the combination with a supply circuit and a plurality of main dynamo-electric machines severally having armatures and field-magnet windings, of a plurality of auxiliary dynamo-electric machine armatures, means for connecting one of said auxiliary armatures in series relation and the other auxiliary armature in parallel relation to said main machines during both acceleration and regeneration, and means for inherently varying the main armature voltages to maintain a substantially equal division of load between the regenerative machines.

4. In a system of control, the combination with a supply-circuit and a plurality of momentum-driven main dynamo-electric machines severally having armatures and field-magnet windings, of auxiliary dynamo-electric means for inaugurating regenerative operation of the main machines, said means being provided with certain differentially-disposed field-magnet windings, means for varying the relative effect of said windings under predetermined conditions, and means for interconnecting non-corresponding armatures and field windings.

5. In a system of control, the combination with a supply circuit and a plurality of momentum-driven main dynamo-electric machines severally having armatures and field-magnet windings, of a plurality of auxiliary dynamo-electric machine armatures, means for connecting said auxiliary armatures in circuit to inaugurate regenerative operation of the main machines, a shunt-excited field-magnet winding for one of said armatures, a second field-magnet winding therefor connected in series relation therewith and with said main machine and differentially disposed with respect to said shunt-excited field winding, means for varying the relative effects of said auxiliary field windings under predetermined conditions, and means for interconnecting non-corresponding main armatures and field windings.

6. In a system of control, the combination with a supply circuit and a plurality of main dynamo-electric machines severally having armatures and field-magnet windings, of a plurality of auxiliary dynamo-electric machine armatures, means for connecting one of said auxiliary armatures in series relation and the other auxiliary armature in parallel relation to said main machines during both acceleration and regeneration, means for connecting the corresponding main armatures and field windings during acceleration, and means for connecting the non-corresponding main armatures and field windings during regeneration.

7. In a system of control, the combination with a supply circuit and a plurality of momentum-driven main dynamo-electric machines severally having armatures and field-magnet windings, of a plurality of auxiliary dynamo-electric machine armatures, means for connecting one of said auxiliary armatures in series relation and the other auxiliary armature in parallel relation to said main machines during regenerative operation, exciting means associated with said auxiliary armatures for gradually varying the voltage of the first auxiliary armature to apply an oppositely-varying voltage to the main machines, and means for interconnecting non-corresponding main armatures and field windings during regenerative operation.

8. In a system of control, the combination with a supply-circuit, and a plurality of main dynamo-electric machines severally having armatures and field windings excited solely therefrom during regenerative operation, of a plurality of auxiliary dynamo-electric machine armatures, means for connecting the first of said auxiliary armatures in series relation and the second auxiliary armature in parallel relation to said main machines during regenerative operation, a supply-circuit-excited field-magnet winding and a differentially-connected series-excited field-magnet winding for said first auxiliary armature, a field-magnet winding for said second auxiliary armature, means for varying the effects of said field-magnet windings, and means for interconnecting non-corresponding main armatures and field windings during regenerative operation.

9. In a system of control, the combination with a supply circuit, and a plurality of main dynamo-electric machines severally having armatures and field-magnet windings excited solely therefrom during regenerative operation, of a plurality of auxiliary dynamo-electric machine armatures connected in series relation across the supply circuit, a plurality of field-magnet windings for the respective auxiliary armatures connected between a point intermediate the auxiliary armatures and a point intermediate the main armatures, a plurality of other auxiliary field-magnet windings respectively differentially connected with respect to the corresponding auxiliary series field windings, means for oppositely and simultaneously varying the voltages of the auxiliary armatures to effect regulation of the main machines, and means for interconnecting non-corresponding main armatures and field windings during regenerative operation.

10. In a system of control, the combination with a supply-circuit, and a plurality of main dynamo-electric machines severally adapted for both acceleration and regeneration and severally having armatures and field-magnet windings, of a plurality of auxiliary dynamo-electric machine armatures, means for connecting one of said armatures in series relation and the other in parallel relation with the main machines under predetermined conditions, a plurality of field-magnet windings for the respective auxiliary armatures connected between a point intermediate the auxiliary armatures and a point intermediate the main armatures under such conditions, means for connecting said auxiliary armatures and field windings in series-circuit relation under other predetermined conditions, means for connecting substantially the mid-point of the auxiliary series circuit to said point intermediate the main armatures under said last conditions, and means associated with said auxiliary field windings for oppositely and simultaneously varying the voltages of the main armatures.

11. In a system of control, the combination with a supply circuit, and a plurality of main dynamo-electric machines severally adapted for both acceleration and regeneration and severally having armatures and field-magnet windings of the series-type excited solely therefrom during regeneration, of a plurality of auxiliary dynamo-electric machine armatures, means for connecting one of said armatures in series relation and the other in parallel relation with the main machines during relatively high-speed regeneration, a plurality of field-magnet windings for the respective auxiliary armatures connected between a point intermediate the auxiliary armatures and a point intermediate the main armatures during relatively high-speed regeneration, means for connecting said auxiliary armatures and field windings in series-circuit relation across the supply-circuit during relatively low-speed regeneration, means for connecting a point intermediate the pairs of associated auxiliary armatures and field windings to said point intermediate the main armatures during relatively low-speed regeneration, a plurality of supply-circuit-excited field-magnet windings for the respective auxiliary armatures differentially connected with respect to the corresponding auxiliary series field windings, and means for interconnecting non-corresponding main armatures and field windings during regeneration.

12. In a system of control, the combination with a supply circuit and a main dynamo-electric machine having an armature and a field-magnet winding, of a plurality of auxiliary dynamo-electric machine armatures, means for connecting one of said auxiliary armatures in series relation with said main machine, means for varying the voltage of said series-connected auxiliary armature to always oppose the supply-circuit voltage during motor operation of the main machine, and means for varying the voltage of said auxiliary armature to have the same direction as the supply-circuit voltage during initial regenerative operation of the main machine.

13. In a system of control, the combination with a supply circuit and a main dynamo-electric machine adapted for both acceleration and regeneration, of a plurality of auxiliary dynamo-electric machine armatures, means for connecting one of said auxiliary armatures in series relation with said main machine, means for exciting said auxiliary armature to cause its voltage to oppose the supply-circuit voltage only during accelerating operation of the main machine to assist the supply-circuit voltage during high-speed regenerative operation and to again oppose the supply-circuit voltage during low-speed regenerative operation of the main machine.

14. In a system of regenerative control, the combination with a supply circuit and a main momentum-driven dynamo-electric machine, of an auxiliary motor-generator set, means for disposing said set to increase the supply-circuit voltage during relatively high-speed conditions, and means for disposing said set to divide the supply-circuit voltage under relatively low-speed conditions.

15. In a system of regenerative control, the combination with a supply circuit and a main momentum-driven dynamo-electric machine, of a plurality of auxiliary dynamo-electric machine armatures, means for disposing one of said auxiliary armatures in series relation with the main machine and means for connecting the other auxiliary armature across the supply circuit under relatively high-speed conditions, and means for disposing said auxiliary armatures in series relation across the supply circuit and means for connecting the main machine to a point intermediate the auxiliary armatures during relatively low-speed conditions.

16. In a system of control, the combination with a supply circuit and a plurality of momentum-driven main dynamo-electric machines severally having armatures and field-magnet windings, of auxiliary dynamo-electric means for inaugurating regenerative operation of the main machines, said means being provided with certain differentially-disposed field-magnet windings, and means for inherently maintaining a substantially equal distribution of regenerative current between the main machines.

17. In a system of control, the combination with a supply circuit and a plurality of momentum-driven main dynamo-electric machines severally having armatures and field magnet windings, of auxiliary means for increasing the voltage impressed upon the main machine terminals upon an increase of regenerative current, and means for inherently maintaining a substantially equal distribution of the regenerative current between the main machines.

18. In a system of control, the combination with a supply circuit and a plurality of main dynamo-electric machines severally having armatures and field-magnet windings, of a plurality of auxiliary dynamo-electric machine armatures, means for connecting one of said auxiliary armatures in series relation to said main machines during both acceleration and regeneration, and means for inherently varying the main armature voltages to maintain a substantially equal division of load between the regenerative machines.

19. In a system of control, the combination with a supply circuit and a plurality of momentum-driven main dynamo-electric machines severally having armatures and field-magnet windings, of a plurality of auxiliary dynamo-electric machine armatures, means for connecting one of said auxiliary armatures in series relation to said main machines during regenerative operation, exciting means associated with said auxiliary armatures for gradually varying the voltage of the first auxiliary armature to apply an oppositely-varying voltage to the main machines, and means for interconnecting non-corresponding main armatures and field windings during regenerative operation.

20. In a system of control, the combination with a supply circuit and a main dynamo-electric machine, of a plurality of auxiliary dynamo-electric machine armatures, means for connecting one of said auxiliary armatures in series relation with said main machine, and means for connecting the other auxiliary armature in parallel relation to said machine under predetermined low-voltage conditions and across the supply circuit under high-voltage conditions of the main machine.

In testimony whereof, I have hereunto subscribed my name this 31st day of Dec. 1915.

RUDOLF E. HELLMUND.